(12) United States Patent
Willey

(10) Patent No.: US 8,244,280 B2
(45) Date of Patent: Aug. 14, 2012

(54) APPARATUS, AND ASSOCIATED METHOD, FOR CONFIGURING A PAGE MESSAGE USED TO PAGE AN ACCESS TERMINAL IN A RADIO COMMUNICATION SYSTEM PURSUANT TO A PARTIAL IDENTITY COMPARISON SCHEME

(75) Inventor: William Daniel Willey, San Francisco, CA (US)

(73) Assignee: Research In Motion Limited, Waterloo (CA)

( * ) Notice: Subject to any disclaimer, the term of this patent is extended or adjusted under 35 U.S.C. 154(b) by 797 days.

(21) Appl. No.: 11/469,991

(22) Filed: Sep. 5, 2006

(65) Prior Publication Data

US 2008/0057986 A1    Mar. 6, 2008

(51) Int. Cl.
*H04W 68/00* (2009.01)
(52) U.S. Cl. ..... 455/458; 455/443; 455/429; 455/435.2; 455/435.1
(58) Field of Classification Search .......... 455/458, 455/426.1, 574, 343.2, 343.3, 127.5, 574.3, 455/343, 3; 370/310, 311, 312, 313
See application file for complete search history.

(56) References Cited

U.S. PATENT DOCUMENTS

| | | | | |
|---|---|---|---|---|
| 6,507,743 | B1 * | 1/2003 | Abrishamkar et al. | 455/458 |
| 8,170,041 | B1 * | 5/2012 | Underwood et al. | 370/412 |
| 2002/0142785 | A1 * | 10/2002 | Park et al. | 455/458 |
| 2007/0015523 | A1 * | 1/2007 | Prakash et al. | 455/458 |
| 2008/0032713 | A1 * | 2/2008 | Yang | 455/458 |
| 2008/0057983 | A1 * | 3/2008 | Willey | 455/458 |
| 2008/0070597 | A1 * | 3/2008 | Willey | 455/458 |

FOREIGN PATENT DOCUMENTS

| | | |
|---|---|---|
| EP | 1696593 A2 | 8/2006 |
| WO | 03024146 A1 | 3/2003 |

OTHER PUBLICATIONS cdma2000 High Rate Packet Data Air Interface, Specification 3GPP2 C.S0024-B Version 1.0 Date: Apr. 2006.*

* cited by examiner

*Primary Examiner* — Rafael Pérez-Gutiérrez
*Assistant Examiner* — Suhail Khan

(57) ABSTRACT

Apparatus, and an associated method, for facilitating paging of access terminals by way of a quick page message. A partial identity comparison scheme is utilized. Identifiers of access terminals that are to be paged in the quick page message are determined and compared. In the event that the identifiers are of redundant values, the redundant values are removed, thereby to provide additional locations in the quick page message that are not redundant for use better to page the access terminals that are to be paged.

20 Claims, 2 Drawing Sheets

APPARATUS, AND ASSOCIATED METHOD, FOR CONFIGURING A PAGE MESSAGE USED TO PAGE AN ACCESS TERMINAL IN A RADIO COMMUNICATION SYSTEM PURSUANT TO A PARTIAL IDENTITY COMPARISON SCHEME

The present invention relates generally to a manner by which to page an access terminal of a radio communication system to alert the access terminal of a pending call, or other communication. More particularly, the present invention relates to apparatus, and an associated method, by which to form a quick page message that is selectably free of redundant values.

When quick paging is performed using a partial identity comparison, the pages included in the quick page message are of configurations and lengths best to minimize the occurrence of false wakeup of an access terminal. Excessive battery depletion as a result of false wakeup of the access terminal is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also providing the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000EV-DO specification standard defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between recharging or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH.

In one configuration, the quick page message contains quick page indicators. The quick page message includes a number of quick page indicator slots populated with the quick page indicators that indicate whether an access terminal is being paged. An exemplary configuration of a scheme that utilizes page indications is set forth, for instance, in industry contribution 3GPP2 C20-20060731-033. In this configuration, during operation, a mobile station hashes to a quick page indicator location, i.e., slot, within the quick page message based upon a session seed, i.e. a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In another configuration, a partial hash comparison scheme is provided. In the disclosed partial hash comparison scheme, the access network forms a quick page message in which a portion of a hash of an access terminal identifier (ATI) of an access terminal that is paged is placed in the quick page message. An access terminal that monitors for the delivery of a quick page message, reads the content of the message and compares the values with corresponding values, that is, portions of a hash of the identifier of that access terminal. If the values do not match, then the access terminal enters into a reduced power state, e.g., a sleep state.

The QPCH message, as presently-proposed, provides thirty-five page indication locations, i.e., bits available to be populated with paging indicators. The aforementioned "partial hash comparison" scheme utilizes three of the thirty-five page indication locations for identifying the number of pages, and the remaining page indication locations are available for paging, viz., are available. While the proposed, partial hash comparison scheme reduces the false wakeup probability when paging load is relatively low, when the paging load increases, the reduction in the available page indication locations actually increases the possibility of false wakeup. When more than five access terminals are paged, partial hash comparison is not used due to this increased possibility. Instead, hashing to page indication locations is performed.

If a manner could be provided by which to improve the performance of a scheme that utilizes partial comparison pursuant to paging by better reducing the possibility of false wakeup, improved battery longevity of the access terminal would be possible.

It is in light of this background information related to paging by an access network of an access terminal that the significant improvements of the present invention have evolved.

DETAILED DESCRIPTION

Figure 1:
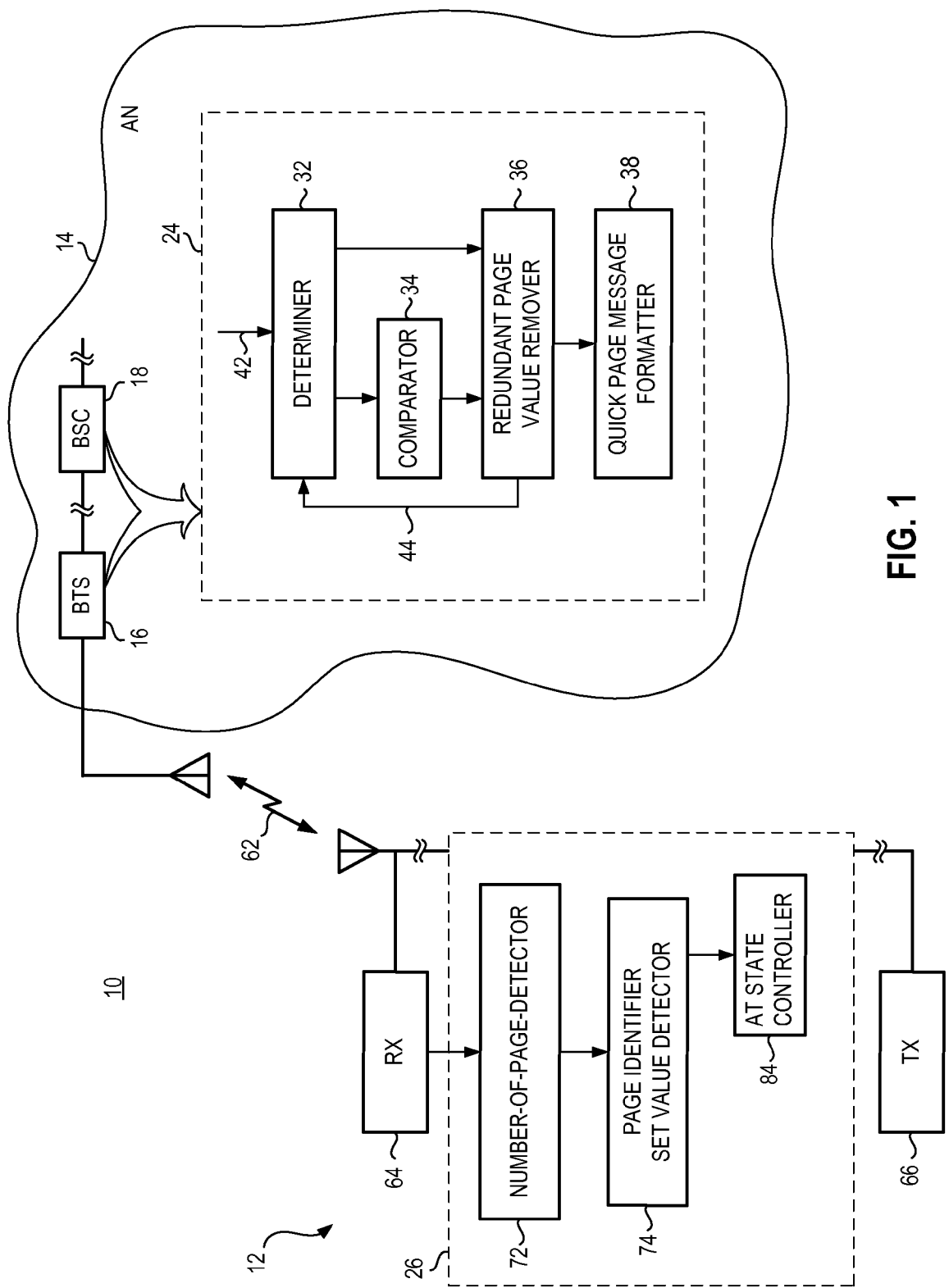
FIG. 1 illustrates a functional block diagram of a radio communication system in which an embodiment of the present invention is operable.

The present invention, accordingly, advantageously provides apparatus, and an associated method, by which to page an access terminal of a radio communication system to alert the access terminal of a pending call, or other communication.

Through operation of an embodiment of the present invention, a manner is provided by which to form a quick page message that is selectably free of redundant values.

Improved quick paging is provided that lessens the likelihood of false wakeup of an access terminal, thereby improving the longevity of the battery that powers the access terminal. Pursuant to operation, when quick paging is performed using a partial identity comparison, the pages included in the quick page message are of configurations and lengths best to minimize the occurrence of false wakeup of the access terminal.

In another aspect of the present invention, a partial identity scheme is utilized in the quick paging procedure. The partial identity comparison utilizes parts of access terminal identifiers (ATIs) or other numbers that are associated with access terminals that are paged. The portion of the ATI, or other number, that is included in the quick page message comprises, for instance, a selected number of most significant bits of the number. The length of the portion of the number included in the quick page message is dependent upon one or more factors.

As the length of the quick page message is prescribed, e.g., is of a thirty-five bit length, the lengths of the parts of the ATIs or other numbers included in the quick page message are limited by this prescribed length. If multiple pages are contained in the quick page message, only fractional portions of the parts of the ATIs or other numbers are able to be included in the quick page message. When the number of pages increase, the size, i.e., lengths, of the parts of the numbers that are includable in the quick page message are reduced.

A first portion of the quick page message, such as a first, three-bit portion, identifies the number of pages in the message. If the quick page message is of a length of thirty-five bits, and, e.g., the number of page indications is three-bits in length, then the number of bits available to identify the access terminals is reduced to thirty-two of the thirty-five bits. When a single access terminal is paged, all thirty-two bits are available by which to identify the paged access terminal. When two access terminals are paged, half of the thirty-two available bits are available to identify each of the two access terminals being paged. Analogously, when three access terminals are paged, one-third of the thirty-two bits are available to identify each of the three access terminals being paged. Because three does not divide into thirty-two equally, the number of bits available to identify different ones of the three access terminals is dissimilar. Or, one or more bits are not utilized to identify the paged access terminals. Analogous divisions and distributions are provided for higher numbers of paged access terminals.

In another aspect of the present invention, a determination is first made of the number of pages that are to be included in the quick page message. And, the corresponding parts of ATIs or other numbers that are used to identify the paged access terminals are configured. The most significant bits, for instance, of the number known to both the access terminal and the access network are used. For example, parts of the ATIs are utilized. For example, if sixteen bits are available to identify an access terminal, such as when the quick page message is to page two access terminals, the sixteen most significant bits of the number are utilized. If preferred, least significant bits are instead utilized. A comparator compares the values that identify the access terminals. In the event that the values identifying the different access terminals that are to be paged correspond, then redundant values are deleted by a redundant page value remover. The bits that would otherwise need to be provided for population with the redundant values are able, instead, to be utilized for other purposes.

In a further aspect of the present invention, all of the bit locations of the quick page message available to identify access terminals are used. The number of bits available to identify each access terminal need not be equal. For instance, if three access terminals are to be paged in the quick page message, two of the terminals are identified with ten bit values while a third of the access terminals is identified with an eleven bit-length value. Through use of all of the available parts of the quick page message, false wakeup of an access terminal is proportionately less likely to occur.

In these and other aspects, therefore, an apparatus and an associated method, is provided for an access network of a communication network that generates a first page message on a first paging channel. A determiner is configured to determine page values of each page identifier set of each page intended to be included in the first page message. A redundant page value remover is configured selectably to remove page values intended to be included in the first page message that are redundant to page values of another page identifier set, if any, also intended to be part of the first page message. The first page message is formed of page value sets selectably free of page value set redundancies.

In these and further aspects, an apparatus and an associated method, is provided for an access terminal that monitors a first paging channel for delivery of a first paging message. A number of pages detector is configured to detect how many page identifier sets are included in the first paging message. A page identifier set value detector is configured to detect values of each page identifier set detected by the number of pages detector to be included in the first paging message. The first paging message is selectably free of page value set redundancies.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, access terminals are alerted, by broadcast of a page message when a communication, initiated at the network, is to be terminated at an access terminal. A quick paging channel (QPCH), or analogous channel, is defined. Information contained in a quick page message broadcast on the quick paging channel identifies access terminals that are paged. When an access terminal detects, from the quick page message, that the access terminal is paged, the access terminal further operates in anticipation of the page and subsequent communication. The access terminal, conversely, enters into a reduced-power consumption state, e.g., a sleep state if the access terminal does not detect that it is being paged. If the access terminal incorrectly determines that it is being paged, the access terminal falsely wakes up. And, increased levels of power are consumed by the access terminal, resulting in reduced battery longevity. The aforementioned partial hash comparison scheme is intended to reduce the likelihood of false wakeup of the access terminal, but, as presently implemented, provides advantages only when a quick page message pages five or fewer access terminals. Additionally, not all of the bits of a quick page message are fully utilized in every paging scenario, and the existing scheme, for this reason, is less than ideal.

Accordingly, pursuant to an embodiment of the present invention, the access network includes apparatus 24, and the access terminal includes apparatus 26, that operate pursuant to quick page message generation and quick page message receipt in manners that reduce the likelihood of occurrence of false wakeup relative to an existing partial hash comparison scheme. The elements of the apparatus 24 and of the apparatus 26 are functionally represented, implementable in any desired manner, including, for instance, by algorithms executable by processing circuitry.

The elements forming the apparatus 24 are implemented at any appropriate location of the access network, including, as illustrated, at the BTS 16 or BSC 18, or distributed amongst such entities, as well as others.

Here, the apparatus 24 includes a determiner 32, a comparator 34, a redundant page value remover 36, and a quick page message formatter 38.

The determiner 32 operates to determine page values of page identifier sets that are associated with access terminals that are to be paged in a quick page message. That is to say, the determiner is provided, here indicated by way of the lines 42, with the identities, such as by their ATIs, of the access terminals that are to be paged. The number of terminals that are paged is determinative of the lengths of the page identifier sets that are includable in the quick page message. When more pages are to be included in the page message, the lengths of the page identifier sets that identify each of the access terminals being paged are less than the lengths permitted when fewer numbers of access terminals are being paged. Most significant bits of the ATIs are used. And, the determiner determines the parts of the ATIs that can be used, depending upon the number of pages to be included in the quick page message. If two pages are to be included in the quick page message, each page identifier set is of sixteen-bit lengths, the sixteen most significant bits of the ATIs. When numbers other than ATIs are used, analogous portions of such other numbers are, e.g., instead utilized. In the exemplary implementation in which thirty-two bits are available in which to identify the access terminals and three bits are used to identify the number of pages in the quick page message, the thirty-two bits are collectively available by which to be used to identify access terminals that are to be paged. Pursuant to a further embodiment of the present invention, in the event that the number of access terminals that are to be paged does not permit for an equal division of the thirty-two bits, unequal numbers of bits are allocated to identify different ones of the access terminals while fully utilizing all thirty-two available bits. For instance, when three access terminals are to be paged, one access terminal is identified with an eleven-bit length page identifier set while the other two access terminals are identified with ten-bit length page identifier sets.

Indications of the identifiers determined by the determiner are provided to a comparator 34. The comparator 34 operates to compare the different values and to identify if any of the page identifier sets are of identical values. When parts of the ATIs are utilized, that is to say, the selected number of most significant bits of the ATIs of the access terminals that are to be paged are used, there is a possibility that the most significant bits identifying more than one access terminal are identical to the corresponding values that identify another access terminal. Operation of the comparator identifies such identical values.

Indications of comparisons made by the comparator are provided to the redundant page value remover 36. The redundant page value remover 36 removes values, that is to say, page identifier set bits, that are redundant, freeing up bit space in the quick page message. In the exemplary implementation, upon removal of the redundant bit values, the determiner is caused to redetermine the page values of the identifiers of the access terminals that are to be paged. Here, indication is provided to the determiner by way of the line 44 of the removal of the redundant bit values and the need to redetermine the identifiers used to identify the paged access terminals. Upon removal of the redundant page values, increased bits are available to identify the access terminals that are paged or, the partial identity comparison scheme is able to be used when greater than five access terminals are to be paged. Redetermined values are provided by the determiner to the redundant page value remover and thereafter provided to the quick page message formatter 38. The quick page message formatter 38 forms the quick page message populated with page identifier sets that are selectably free of redundancies.

Transceiver elements of the base transceiver station 16 cause broadcast of quick page messages that have been formatted by the quick page message formatter 38. The messages are broadcast upon a radio air interface, represented in FIG. 1 by the arrow 60. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number of pages detector 73 and a page identifier set value detector 74. The elements are functionally represented, also implementable in any desired manner, including algorithms executable by processing circuitry. The detector 73 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector, the page value lengths of the page identifier set or sets contained in the quick page message. In the event that the detector detects the access terminal is not paged, an indication is provided to an access terminal (AT) state controller 84 to cause the access terminal to be placed in a reduced-power state, e.g., a sleep mode. If a page is detected, conversely, an indication is provided to the state controller and the controller 84 causes the state of the access terminal to permit its further operation with respect to paging and further communication.

While the existing partial hash comparison scheme is used only when five or fewer access terminals are paged, operation of an embodiment of the present invention is potentially permitting of performance of a partial identity comparison scheme in the event that more than five access terminals are being paged, but one or more of the identifiers, that is, page identifier sets are identical. For example, if seven access terminals are being paged and three of the access terminals being paged have the same six bits as their most significant bits, the apparatus 24 operates to eliminate two of the three duplicates page identifier sets and is then able to include five six-bit page identifier sets, herein also referred to as hashes, using partial identity comparison. Otherwise, individual page indication bits are inserted in specified locations of the message, their locations being selected through operation of a hash function generator.

Figure 2:
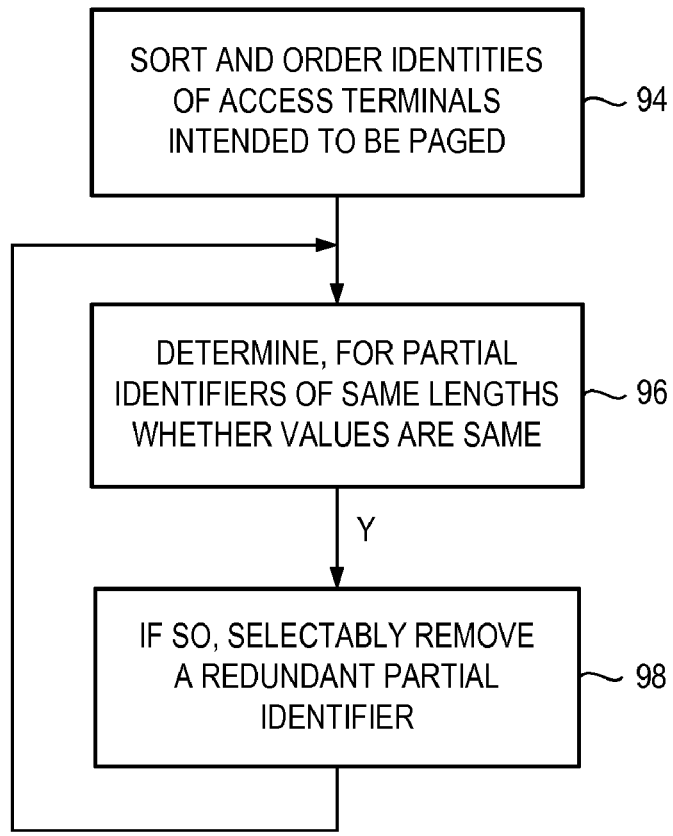
FIG. 2 illustrates a process diagram representative of the process of operation of an embodiment of the present invention.

FIG. 2 illustrates a diagram, shown generally at 92, representative of a procedure performed at the apparatus 26, or otherwise at the access network, by which to eliminate duplicate values from a quick page message. First, and as indicated by the block 94, the identities are sorted and ordered with the process first commencing with identities having the largest lengths, that is to say, largest number of bits. Then, and as indicated by the decision block 96, a determination is made as to whether the identities of that number of bits, that is length, are of the same values. If so, the yes branch is taken and, as indicated by the block 98, a redundant identity value is removed. The process continues for so long as there are enough partial identities of the size to hold the remaining identities. If the number of partial identities at this size is the same as the number of identities that remain, the partial identities are filled into a message, and the process ends.

If the current number of bits of the partial identity is equal to the smallest number possible, then the partial identity comparison scheme is not utilized. Instead, paging indicators are utilized. As noted above, pursuant to exemplary operation, all bits of the quick page message are used even if unequal bit number allocations are made for paging different access terminals within a single page message. By doing so, the false wakeup probability is reduced. Additionally, partial bits of random or pseudorandom numbers known to both the access network and the access terminal are used for the reason that such values are sometimes more random than a hash value generated by a hash function. And, further, partial address bits are used for this reason rather than partial hash bits.

Figure 3:
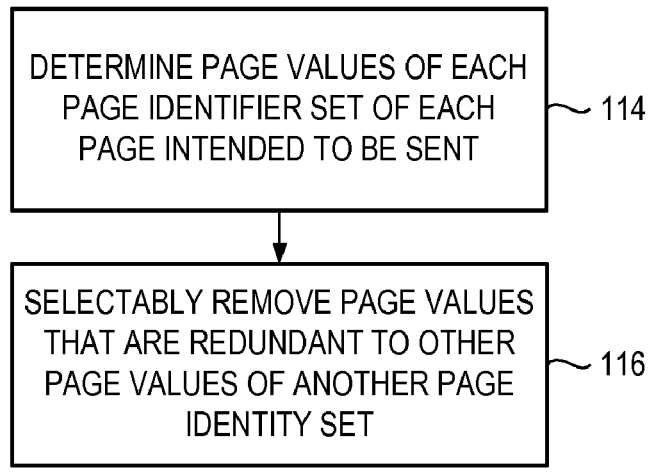
FIG. 3 illustrates a method flow diagram listing the method of operation of an embodiment of the present invention.

FIG. 3 illustrates a method flow diagram, shown generally at 112, representative of the method of operation of an embodiment of the present invention. The method facilitates paging by an access network that selectably generates a first page message on a first paging channel.

First, and as indicated by the block 114, page values of each page identifier set of each page intended to be included in the first page message is determined. Then, and as indicated by the block 116, page values intended to be included in the first page message are selectably removed. The page values selected to be removed are those that are redundant to page values of another page identity set.

The previous descriptions are of preferred examples for implementing the invention, and the scope of the invention should not necessarily be limited by this description. The scope of the present invention is defined by the following claims.

What is claimed is:

1. Apparatus for an access network of a communication network that generates a first page message on a first paging channel, said first page message being comprised of a first fixed number of binary digits and which can be used to page wireless access terminals within the access network, each access terminal being identified by a plurality of binary digits that form a page identifier set, said apparatus comprising:
a determiner configured to receive a number of page identifier sets that identify access terminals and to determine there from, a number of page value sets to be fitted into the first page message, page value sets in the first page message being comprised of portions of the received page identifier sets when two or more access terminals are to be paged, the determiner being additionally configured to determine the portion and number of binary digits of each received page identifier set to be used to form each page value set to be included in the first page message, wherein a second page value set selected to identify a second access terminal matches a first page value set selected to identify a different first access terminal and the second page value set is considered redundant to the first page value set; and
a redundant page value remover configured to remove the second page value set that is redundant to the first page value set, as a result of the match, from a list of page value sets intended to be part of the first page message, thereby causing formation of the first page message free of the redundant second page value set, the first pare value set of the first pare message used to pare the different first access terminal and the second access terminal.

2. The apparatus of claim 1 further comprising a comparator configured to compare each page value set intended to be included in the first page message and wherein the second page value set removed by said redundant page value remover is removed responsive to comparisons made by said comparator.

3. The apparatus of claim 1 wherein each page value set comprises a selected number of bits of a page identifier set associated with a corresponding page.

4. The apparatus of claim 3 wherein the selected number of bits of each page value set is responsive to how many pages are intended to be included in the first paging message.

5. The apparatus of claim 1 wherein said determiner is further configured to select the lengths of the page value sets.

6. The apparatus of claim 5 wherein the first page message is of a prescribed length and wherein the lengths of the page value sets determined by said determiner are dependent upon both the prescribed length of the first page message, and the number of page value sets included in the first page message.

7. The apparatus of claim 6 wherein the first page message includes a page identity part and wherein each page value set of the first page message is inserted in the page identity part.

8. The apparatus of claim 7 wherein determined by said determiner of the lengths of the page value sets comprises selection to fill the page identity part.

9. The apparatus of claim 8 wherein the first page message comprises a plurality of pages identified by a corresponding, plurality of page value sets, a length of at least one page value set is different than the length of another page value set.

10. The apparatus of claim 1 wherein the page values of each page value set comprise parts of access terminal identifiers or other numbers that are associated with access terminals that are defined in the access network.

11. A method for facilitating paging by an access network that generates a first page message on a first paging channel, said first page message being comprised of a first fixed number of binary digits and which can be used to page wireless access terminals within the access network, each access terminal being identified by a plurality of binary digits that form a page identifier set, said method comprising:

determining a number of page value sets from a number of page identifier sets to be fit into the first page message, the page value sets being comprised of portions of the page identifier sets associated with the access terminals to be paged and determining whether a portion of the binary digits of each identifier set to be used to form each page value set intended to be included within the first page message is the same as another page identifier set, wherein a second page value set selected to identify a second access terminal matches a first page value set selected to identify a different first access terminal and the second page value set is considered redundant to the first page value set; and removing the second page value set that is redundant to the first page value set, as a result of the match, from a list of page value sets intended to be part of the first page message, thereby causing formation of the first page message free of the redundant second page value set, the first pare value set of the first page message used to page the different first access terminal and the second access terminal.

12. The method of claim 11 further comprising comparing each page value set intended to be included in the first page message and wherein the removed page value sets are removed responsive to comparisons made during comparison.

13. The method of claim 11 wherein each page value set comprises a selected number of bits of a page identifier set associated with a corresponding page.

14. The method of claim 13 wherein the selected number of bits of each page value set is responsive to how many pages are intended to be included in the first page message.

15. The method of claim 11 further comprising selecting page value set lengths that are determinative, in part, of the page values.

16. The method of claim 15 wherein the first page message is of a prescribed length and wherein the lengths of the page value sets are dependent upon both the prescribed length of the first page message and the number of page value sets included in the first paging message.

17. The method of claim 16 wherein the first page message includes a page identity part and wherein each page value set of the first page message is inserted in the page identity part.

18. The method of claim 11 further comprising:
broadcasting the first page message to an access terminal; and
deciding at the access terminal whether the access terminal is paged.

19. The method of claim 11 wherein said operation of removing comprises iteratively removing redundant page values until the page value sets are collectively of a desired length.

20. The method of claim 11 wherein the values of each page identifier set comprise parts of access terminal identifiers or other numbers that are associated with access terminals that are defined in the access network.

* * * * *

UNITED STATES PATENT AND TRADEMARK OFFICE
CERTIFICATE OF CORRECTION

Page 1 of 1

PATENT NO. : 8,244,280 B2
APPLICATION NO. : 11/469991
DATED : August 14, 2012
INVENTOR(S) : William Daniel Willey It is certified that error appears in the above-identified patent and that said Letters Patent is hereby corrected as shown below:

Col. 8, Claim 1, Line 39, please delete "...the first pare...", and insert --...the first page...--.

Col. 8, Claim 1, Line 40, please delete "...the first pare...", and insert --...the first page...--.

Col. 8, Claim 1, Line 40, please delete "...used to pare...", and insert --...used to page...--.

Col. 9, Claim 11, Line 34, please delete "...first pare...", and insert --...first page...--.

Signed and Sealed this
Fifteenth Day of January, 2013

David J. Kappos
*Director of the United States Patent and Trademark Office*